(12) United States Patent
Hegde et al.

(10) Patent No.: US 12,154,010 B2
(45) Date of Patent: Nov. 26, 2024

(54) COMPUTER-BASED SYSTEMS CONFIGURED TO AUTOMATICALLY GENERATE A INTERACTION SESSION BASED ON AN INTERNAL IDENTIFICATION TOKEN AND METHODS OF USE THEREOF

(71) Applicant: Broadridge Financial Solutions, Inc., Newark, NJ (US)

(72) Inventors: Krishna Hegde, Newark, NJ (US); Mitchell Herman, Newark, NJ (US); Terry Ashby, Newark, NJ (US); RajSekhar Reddygari, Newark, NJ (US); Steven Pirella, Newark, NJ (US); Pat Scaglione, Newark, NJ (US)

(73) Assignee: Broadrige Financial Solutions, Inc., Newark, NJ (US)

( * ) Notice: Subject to any disclaimer, the term of this patent is extended or adjusted under 35 U.S.C. 154(b) by 0 days.

(21) Appl. No.: 18/627,258

(22) Filed: Apr. 4, 2024

(65) Prior Publication Data
US 2024/0338601 A1 Oct. 10, 2024

Related U.S. Application Data

(60) Provisional application No. 63/494,195, filed on Apr. 4, 2023.

(51) Int. Cl.
| | |
|---|---|
| *G06N 20/00* | (2019.01) |
| *G06F 16/242* | (2019.01) |
| *G06F 16/248* | (2019.01) |
| *G06N 5/01* | (2023.01) |

(52) U.S. Cl.
CPC ......... *G06N 20/00* (2019.01); *G06F 16/242* (2019.01); *G06F 16/248* (2019.01); *G06N 5/01* (2023.01)

(58) Field of Classification Search
CPC ......... G06N 20/00; G06N 5/01; G06N 5/025; G06F 16/242; G06F 16/248
See application file for complete search history.

(56) References Cited

U.S. PATENT DOCUMENTS

| | | | |
|---|---|---|---|
| 11,847,246 B1 * | 12/2023 | Rodgers | ............... G06N 20/00 |
| 2018/0322175 A1 * | 11/2018 | Kara | ...................... G06F 16/285 |
| 2019/0370854 A1 | 12/2019 | Gao et al. | |
| 2020/0351374 A1 * | 11/2020 | Eberle | ..................... G06F 21/31 |
| 2021/0081837 A1 | 3/2021 | Polleri et al. | |
| 2021/0090079 A1 * | 3/2021 | Sorbello | ............. G06Q 20/383 |
| 2024/0078466 A1 * | 3/2024 | Sharma | ................. G06F 16/951 |

OTHER PUBLICATIONS

International Search Report and Written Opinion from International Application No. PCT/US2024/023126 dated Jul. 24, 2024.

\* cited by examiner

*Primary Examiner* — Dave Misir
(74) *Attorney, Agent, or Firm* — GREENBERG TRAURIG, LLP

(57) ABSTRACT

In some embodiments, the present disclosure provides an exemplary method that may include steps of identifying a plurality of entities seeking to interact with each other, analyzing each entity to determine a type of constraint between each entity of the plurality of entities; automatically generating an internal identification token associated with each entity based on stored information; and utilizing the internal identification token to perform at least one action associated with the interaction of the plurality of entities.

15 Claims, 8 Drawing Sheets

COMPUTER-BASED SYSTEMS CONFIGURED TO AUTOMATICALLY GENERATE A INTERACTION SESSION BASED ON AN INTERNAL IDENTIFICATION TOKEN AND METHODS OF USE THEREOF

RELATED APPLICATIONS

This application claims the benefit of U.S. Application No. 63/494,195 entitled Computer-based Systems Configured to Automatically Connect a Plurality of Data Frameworks Simultaneously and Methods of Use Thereof and fled on Apr. 4, 2023, which is hereby incorporated by reference in its entirety.

FIELD OF TECHNOLOGY

The present disclosure generally relates to computer-based systems configured to automatically program a plurality of controls to modify a communication session associated with a transaction and methods of use thereof.

BACKGROUND OF TECHNOLOGY

Typically, a data schema defines how data is organized within a relational database. This is inclusive of logical constraints such as, table names, fields, data types, and the relationships between these entities. Schemas commonly use visual representations to communicate the architecture of the database, becoming the foundation for an organization's data management discipline. This process of data schema design is also known as data modeling.

SUMMARY OF DESCRIBED SUBJECT MATTER

In some embodiments, the present disclosure provides an exemplary technically improved computer-based method that includes at least the following steps: identifying, by at least one processor, a plurality of entities seeking to interact with each other; analyzing, by the at least one processor, each entity to determine a type of constraint between each entity of the plurality of entities, where an analysis is performed using a trained machine learning module, where the trained machine learning module includes a plurality of trained machine learning parameters, where the plurality of trained machine learning parameters are trained on training constraint pairs, each training constraint pair including: at least one training input of each training constraint pair, the at least one training input including historical entity data associated with each entity, the historical entity data being associated with at least one of: a plurality of historical entities, at least one individual, a result of a client master module, a result of a profile master module, a result of an address master module, and a result of a constraint master module; and at least one training output of each training constraint pair, the at least one training output including a plurality of historical types of constraint associated with each entity; automatically generating, by the at least one processor, an internal identification token associated with each entity based on stored information and the type of constraint between each entity of the plurality of entities, where the internal identification token includes a schema that provides information related to a holder of the internal identification token; and utilizing, by the at least one processor, the internal identification token to perform at least one action associated with the interaction of the plurality of entities. In some embodiments, the trained machine learning module is trained to represent a unique structure detailing a different type of relationship. In some embodiments, the trained machine learning module includes a trained machine learning model including a plurality of trained machine learning parameters. In some embodiments, the plurality of trained machine learning parameters are trained to output the type of constraint based on an input of an entity. In some embodiments, the information includes a unique passcode associated with each entity, a location associated with each entity, a historical type associated with each entity, and a salt value associated with a hashing algorithm of each entity. In some embodiments, the profile master module includes an account master module. In some embodiments, the schema includes a plurality of values organized in a plurality of sets of features. In some embodiments, a first set of features of the plurality of sets of features represents a unique series of digits associated with a particular constraint type, a second set of features of the plurality of sets of features represents a location associated with a particular entity, and a third set of features of the plurality of sets of features represents a historical type associated with the particular entity. In some embodiments, the plurality of sets of features are combined in a hashing algorithm to produce the internal identification token. In some embodiments, the at least one action includes generating an interaction session for the at least two entities to interact based on the internal identification token. In some embodiments, the present disclosure utilizes a data workstation structure to display a plurality of data layers for use during the generated interaction session. In some embodiments, the data workstation structure includes: an entity interface layer, a context passing layer, a theme management layer, a navigation layer, and a login authorization layer. In some embodiments, the present disclosure utilizes a data workstation structure to provide a sitemap layer with a plurality of recently viewed applications in response to the entity entering the generated interaction session; optimize navigational capabilities associated with the generated interaction session; generate at least one query of information within the generated interaction session; and automatically display at least one result of the at least one query on at least one window of the data workstation structure based on the sitemap layer and the navigational capabilities.

In some embodiments, a non-transitory computer-readable storage medium tangibly encoded with computer-executable instructions, that when executed by a device, perform a method including: identifying, by at least one processor, a plurality of entities seeking to interact with each other; analyzing, by the at least one processor, each entity to determine a type of constraint between each entity of the plurality of entities, where an analysis is performed using a trained machine learning module, where the trained machine learning module includes a plurality of trained machine learning parameters, where the plurality of trained machine learning parameters are trained on training constraint pairs, each training constraint pair including: at least one training input of each training constraint pair, the at least one training input including historical entity data associated with each entity, the historical entity data being associated with at least one of: a plurality of historical entities, at least one individual, a result of a client master module, a result of a profile master module, a result of an address master module, and a result of a constraint master module; and at least one training output of each training constraint pair, the at least one training output including a plurality of historical types of constraint associated with each entity; automatically generating, by the at least one processor, an internal identification token associated with each entity based on stored information, where the internal identification token includes a schema that provides information related to a holder of the internal identification token; and utilizing, by the at least one processor, the internal identification token to perform at least one action associated with the interaction of the plurality of entities.

In some embodiments, a system including: a non-transient computer memory, storing software instructions; at least one processor of a computing device associated with a user; where, when the at least one processor executes the software instructions, the computing device is programmed to: identify a plurality of entities seeking to interact with each other; analyze each entity to determine a type of constraint between each entity of the plurality of entities, where an analysis is performed using a trained machine learning module, where the trained machine learning module includes a plurality of trained machine learning parameters, where the plurality of trained machine learning parameters are trained on training constraint pairs, each training constraint pair including: at least one training input of each training constraint pair, the at least one training input including historical entity data associated with each entity, the historical entity data being associated with at least one of: a plurality of historical entities, at least one individual, a result of a client master module, a result of a profile master module, a result of an address master module, and a result of a constraint master module; and at least one training output of each training constraint pair, the at least one training output including a plurality of historical types of constraint associated with each entity; automatically generate an internal identification token associated with each entity based on stored information, where the internal identification token comprises a schema that provides information related to a holder of the internal identification token; and utilize the internal identification token to perform at least one action associated with the interaction of the plurality of entities.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
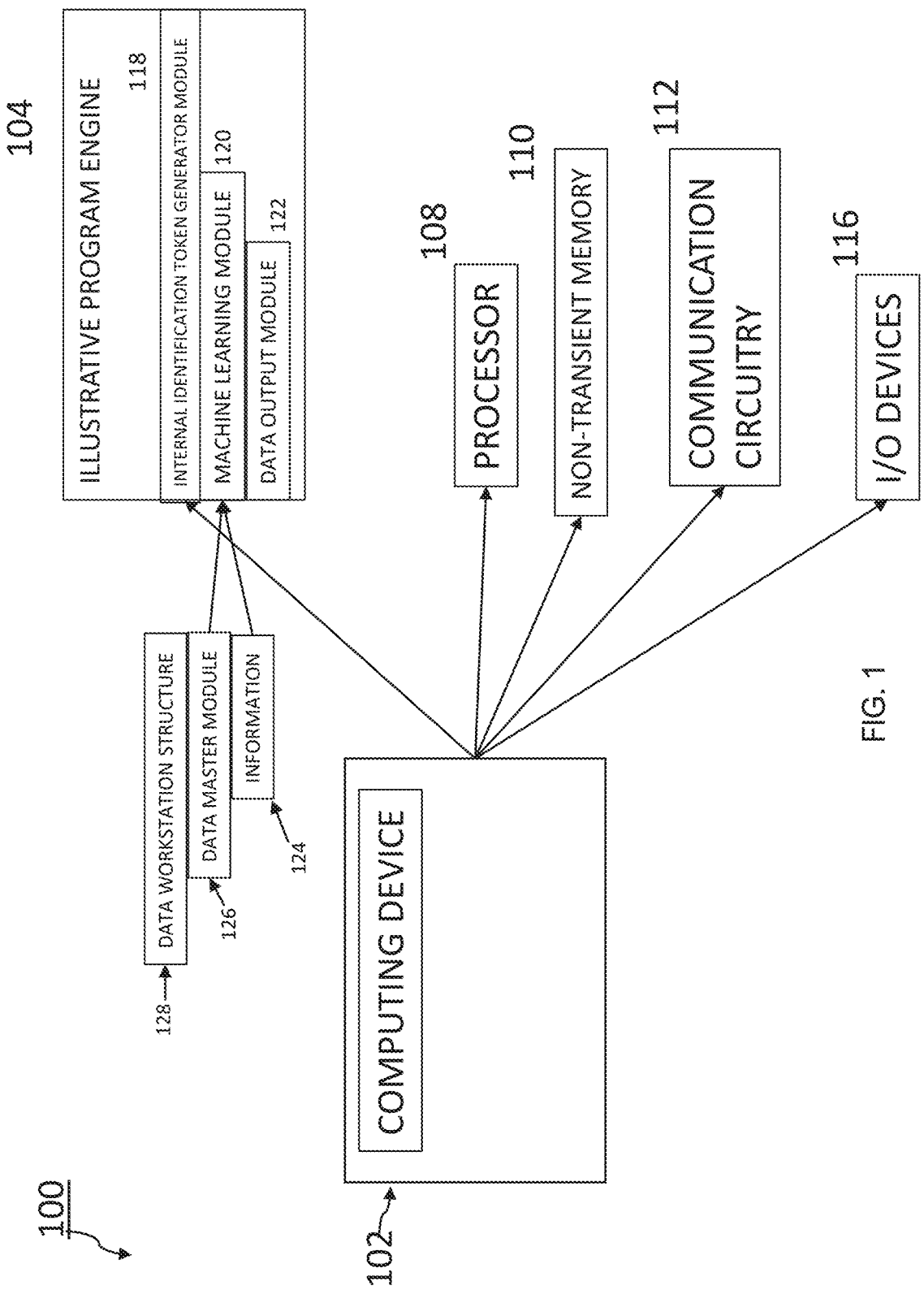
FIG. 1 depicts a block diagram of an exemplary computer-based system and platform for automatically generating an internal identification token associated with an entity, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Each and every principle, methodology and/or system arrangement detailed herein may be utilized with one or more principles, methodology(ies) and/or system arrangement(s) detailed in one or more of: U.S. Pat. Nos. 8,370,244; 8,271,261; 8,103,564; 8,200,567; 8,214,279; 8,793,182; 8,396,785; 8,788,318; 8,521,632; 8,606,669; 9,009,062; 9,507,667; 10,497,062; 8,930,482; 9,319,368; 8,856,046; 9,183,531; 9,195,957; 9,967,238; 10,333,910; 9,967,238; 10,979,405; 10,556,254; 10,133,970; 10,460,218; 10,832,105; 10,554,699; 10,825,093; 11,030,695 or any combination thereof.

At least some embodiments of the present disclosure provide technological solution(s) to at least one technological computer-centered problem associated with generating a data schema between a plurality of parties wanting to interact with each other. An illustrative technological computer-centered problem associated with identifying the plurality of parties seeking to interact with each other are typically organized based solely on a shared constraint between the plurality of parties. The shared constraint between the plurality of parties may determine a type of interaction that may be needed for the plurality of parties to interact, as the shared constraint may place limit on an extent of the interaction between the plurality of parties. For example, a first party may need a specific threshold of funds for a transaction to interact, while the second party may need a specific time of day to interact, where these parties would not be allowed to interact due to non-compatible relationships based on the constraints associated with each relationship. The illustrative technological computer-centered problem decreases an ability for a particular party to interact with a larger number of parties based on the relationships between each party. As detailed in at least some embodiments herein, at least one technological computer-centered solution associated with the illustrative technological computer-centered problem may include automatically generating an internal identification token associated with each party of the plurality of parties based on stored information pulled from an analysis of a trained machine learning module; and utilizing the internal identification token to perform at least one action associated with the interaction of the plurality of parties. In some embodiments, the present disclosure may identify a plurality of entities seeking to interact with each other. In some embodiments, the present disclosure may analyze each entity to determine a type of constraint between each entity of the plurality of entities. In some embodiments, the present disclosure may automatically generate an internal identification token associated with each entity based on stored information. In some embodiments, the present disclosure may utilize the internal identification token to perform at least one action associated with the interaction of the plurality of entities. In some embodiments, the present disclosure may utilize a data workstation framework to display a plurality of windows on a user dashboard upon launch of the generated interaction session, where a plurality of authenticated single sign on codes may be a result of the data workstation framework and correspond with the generated internal identification token to authenticate the interaction session between at least two entities.

FIG. 1 depicts a block diagram of an exemplary computer-based system and platform for automatically generating an internal identification token associated with an entity, in accordance with one or more embodiments of the present disclosure.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transitory memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one communication-enabled computing device of a plurality of communication-enabled computing devices.

In some embodiments, the illustrative program engine 104 may be configured to instruct the processor 108 to execute one or more software modules such as, without limitation, an exemplary internal identification token generator module 118, a machine-learning module 120, and/or a data output module 122.

In some embodiments, an exemplary internal identification token generator module 118 of the present disclosure, utilizes a least one machine learning algorithm, described herein, to identify a plurality of entities seeking to interact with each other. In certain embodiments, the plurality of entities may refer to at least one of, but not limited to, the following: at least one individual, a client master module, a profile master module, an address module, a constraint master module, a financial institution. In certain embodiments, the interaction may refer to a transaction and/or an initiation to a communication session between at least two entities. In some embodiments, the exemplary module 118 may identify each entity of the plurality of entities as prospects, clients, parties, spouses, children, other relatives, attorneys, accountants, interested parties, corporations, partnerships, other legal entities, partners, officers, employers, charities, entities representing sets of accounts, and any other relevant legal entity, and single entities with multiple entity records and tailor subsequent interactions with each other based on the identification of each entity.

In some embodiments, the exemplary internal identification token generator module 118 may analyze each entity to determine a type of constraint shared between each entity of the plurality of entities. In certain embodiments, the exemplary module 118 may perform the analysis using a trained machine learning module 120. In some embodiments, the trained machine learning module 120 may represent a unique structure detailing a different type of constraint by generating a string of unique characters specific to each entity that identifies the type of constraint between the at least two entities. In some embodiments, the exemplary module 118 may generate an interaction session based on the string of unique characters associated with the type of constraint shared between the at least two entities. For example, the exemplary module 118 may generate a particular interaction session based on the between at least one person and/or entities and an account; person/entities any other person/entities; addresses and accounts; accounts and other accounts; and/or groupings such as statement households and marketing households, and any combination of the two. In certain embodiments, the trained machine learning module 120 includes a trained data model based on a plurality of trained data parameters, where the parameters are output of the type of constraint and constraint pairs. In some embodiments, the machine learning module 120 may be trained by utilizing at least one training input of each possible training constraint pair and at least one historical entity data as an established baseline. The historical entity data may be a result of a plurality of external secure modules capable of performing the analysis of the plurality of entities. These external secure data modules may refer to one or more data master 126 and include: a client master, a profile master, an address master and a constraint master. In some embodiments, an output of the trained machine learning module 120 may refer to a plurality of combination types that may be utilized for subsequent interaction sessions between the plurality of entities based on the result of each external secure data module and the training input pairs.

In some embodiments, the exemplary internal identification token generator module 118 may automatically generate an internal identification token associated with each entity based on stored information. In certain embodiments, the internal identification token may refer to a digital representation of the unique set of features obtained via the trained machine learning module 120. The trained machine learning module 120 may be trained to identify the set of features based on received user-preferences, as input, and determine a type of constraint between each entity of the plurality of entities based on the identified set of features. The received user-preferences may refer to a plurality of preferences associated with each entity to distinguish each entity of the plurality of entities. In certain embodiments, the set of features may be fed into a subsequent trained machine learning module capable of predicting the type of communication session to generate based on a determined type of constraint between the plurality of entities. In certain embodiments, the internal identification token may include a data schema that provides information 124 related to a holder (e.g., entity or individual) of the internal identification token, where the data schema may include a plurality of values organized in a plurality of data features. The information 124 may refer a unique passcode associated with each entity, a location associated with each entity, a historical type associated with each entity, a salt value associated with a hashing algorithm of each entity, a subsequent modification to user-preferences associated with the identity of each entity; and/or a modification in authentication steps required to interact with an external computing device. In certain embodiments, each data feature may represent a particular constraint type, a particular entity, a particular location, and/or a particular historical type. In some embodiments, a "feature" or "data feature" may refer to a value according to a suitable data type so as to representing the constraint type, entity, location, historical type, etc. Values can include any one or more, without limitation, of a string, an integer, a Boolean, a floating point, a fixed point, a pointer, a list, an array, a tree, among others or any combination thereof.

In some embodiments, the exemplary internal identification token generator module 118 may utilize the internal identification token to perform at least one action associated with the interaction of the plurality of entities. In certain embodiments, the at least one action may refer to a generation of an interaction session for the at least entities to interact based on the generated internal identification token. The generation of the interaction session of the at least two is based on the output of the trained machine learning module 120; the determination the type of the relationship; and the result of the external secure data modules. This allows for the communication to be particularly tailored to the type of interaction associated with the identify of each entity. For example, the exemplary module 118 may provide an internal account with a unique identification ("ID"), a related client unique ID, a related client branch encoded ID, and/or all account specific data to each entity to optimize a transaction occurring being two entities based on the internal identification token that may be exchanged prior to the initialization of the interaction session. In some embodiments, the at least one action may refer to an orchestration of a transaction between the at least two entities.

In some embodiments, the exemplary internal identification token generator module 118 may utilize a data workstation structure 128, located within the computing device 102, to maintain a plurality of service layers that display the performance of the plurality of actions and subsequent actions. In certain embodiments, the plurality of service layers may refer to: an entity interface (hereinafter "UI/UX") layer, a context passing layer, a theme management layer, a masthead and/or navigation layer, and the login authorization and/or entitlements layer. In certain embodiments, the data workstation structure 128 may have a front-end framework that gives structure and control for systems, pages, and components level customization.

In some embodiments, the exemplary internal identification token generator module 118 may utilize the data workstation structure 128 to allow the plurality of users an ability to dynamically navigate to the platform from a menu to interact with the generated interaction session. In certain embodiments, the exemplary internal identification token generator module 118 may require a digital single sign-on (hereinafter "SSO") entry for each user to navigate the data workstation structure 128.

In some embodiments, the exemplary internal identification token generator module 118 may utilize a screen container to display a plurality of windows on a user dashboard upon launch. In some embodiments, the exemplary internal identification token generator module 118 may display a masthead menu structure based on a plurality of user entitlements within the data workstation structure 128. In some embodiments, the data workstation structure 128 may orchestrate a plurality of data windows simultaneously associated with the generated interaction session between the at least two entities of the plurality of entities. For example, the data workstation structure 128 may display market data in a snap quote box within at least one window of the user dashboard within the generated interaction session based on the particular constraint type. In some embodiments, the exemplary internal identification token generator module 118 may utilize data workstation structure to dynamically print via a browser print function and the plurality of individual applications may retain each applications own print functions where applicable.

In certain embodiments, the exemplary internal identification token generator module 118 may utilize the data workstation structure 128 to generate the plurality of navigations to at least one entity within the interaction session with a capability to redact at least one metadata record associated with the interaction session by adjusting a configuration associated with the generated internal identification token. For example, in the case that the constraint type is determined to be a financial transaction, a particular entity may utilize the data workstation structure 128 to remain anonymous during the interaction session if that is an acceptable parameter of the other entity within the interaction session.

In some embodiments, the exemplary internal identification token generator module 118 may utilize a context passing module that includes a screen to display a plurality of transmissions between the entitles participating on the interaction session and verifies relevant context to the plurality of entities, where the relevant context is associated with the information of each entity. In some embodiments, the data workstation structure 128 may utilize the context passing module to transmit account information and client information in context for each relevant screen with the data dashboard associated with the generated interaction session. In some embodiments, the exemplary internal identification token generator module 118 may utilize an entity interface layer that may be controlled by the data workstation structure 128 and may be configurable through an administration tool to allow real-time feedback from each entity participating in the generated interaction session. In some embodiments, the exemplary internal identification token generator module 118 may utilize the data workstation structure 128 to render additional metadata for a plurality of applications rendered by the entity interface layer. In some embodiments, the data workstation structure 128 may provide a responsive design rendered on multiple devices, such as a screen size of 1280-1920 pixels.

In other embodiments, the exemplary internal identification token generator module 118 may allow a plurality of users to navigate to any application within the data workstation structure 128 from a data dashboard, where the data dashboard provides a plurality of adjustable tab labels to reduce any confusion that may occur from generating the interaction session in a multi-window workstation. In certain embodiments, the exemplary internal identification token generator module 118 may allow each user to quickly navigate to a particular application directly from a top-level main menu associated with the generated interaction session. The plurality of adjustable tab labels may provide users with a plurality of navigational tools to direct to a navigation hierarchy. In some embodiments, the exemplary internal identification token generator module 118 may allow the plurality of users to quickly navigate across views using a second level navigation tool within the data workstation structure 128. In some embodiments, the data workstation structure 128 may include a database of frequently used applications associated with each user of the plurality of users.

In some embodiments, the exemplary internal identification token generator module 118 may provide a sitemap layer to allow quick access to a plurality of recently viewed applications, a plurality of application favorites, and/or the full set of applications that are being enhanced via the data workstation structure 128. In certain embodiments, the exemplary internal identification token generator module 118 may allow each user of the plurality of users to navigate to recently viewed applications, a plurality of quick links and a plurality of user favorites based on the internal identification token.

In some embodiments, the exemplary internal identification token generator module 118 may allow the plurality of users to navigate to any main or client window within the generated interaction session. For example, the data workstation structure 128 may provide: a book query landing page window within the dashboard, where the plurality of users can launch a new application from the digital menu when that is the determined constraint type that bound the at least two entities to interact. In certain embodiments, the exemplary internal identification token generator module 118 may utilize the data workstation structure to display a plurality of data sleeves associated with the generated interaction session, where each data sleeve may refer to a plurality of investment vehicles associated with at least one entity and are willing to be exchanged during the generated interaction session.

In certain embodiments, the exemplary internal identification token generator module 118 may allow the plurality of users to create a new query and/or navigate to a plurality of predetermined links associated with a plurality of applications. In certain embodiments, the creation of a custom query may refer to an ability to drag and drop a plurality of data attributes into the editor panel; and as the query is created, the plurality of users can preview the results in in a preview window within the data workstation structure 128.

In some embodiments, the exemplary internal identification token generator module 118 may provide at least one results view window, where the plurality of users can view the query results and navigate back to the editor screen to edit to the query within the data workstation structure 128. In some embodiments, the exemplary internal identification token generator module 118 may provide at least one saving queries window within the data workstation structure 128, where the plurality of users can save custom queries in order to re-run the saved queries in the future.

In some embodiments, the exemplary internal identification token generator module 118 may consolidate a plurality of client and consent searches over a predetermined period of time. In some embodiments, the exemplary internal identification token generator module 118 may provide enhanced search capabilities to the plurality of users via the data workstation structure 128. In some embodiments, the exemplary internal identification token generator module 118 may expand the additional information displayed within the generated interaction session associated with the internal interaction token. In some embodiments, the exemplary internal identification token generator module 118 may modify the entity interface and/or data workstation structure 128 with a plurality of pre-generated labels and colors associated with a plurality of actions to update each window within the data workstation structure 128.

In some embodiments, the present disclosure describes systems for automatically utilizing at least one trained machine learning algorithm of a plurality of machine learning algorithms within the machine learning module 120 that may identify the plurality of entities seeking to interact with each other. In some embodiments, the machine learning module 120 may analyze each entity to determine the type of constraint between each entity of the plurality of entities. In certain embodiments, the machine learning module 120 may refer to a trained machine learning module 120 capable of representing a unique structure detailing a different type of constraint based on a plurality of parameters to output the type of constraint between the at least two entities. In certain embodiments, the trained machine learning module 120 may be trained to identify the set of features based on received user-preferences, as input, and determine a type of constraint between each entity of the plurality of entities based on the identified set of features. The received user-preferences may refer to a plurality of preferences associated with each entity to distinguish each entity of the plurality of entities. In certain embodiments, the set of features may be fed into a subsequent trained machine learning module capable of predicting the type of communication session to generate based on a determined type of constraint between the plurality of entities. In some embodiments, the parameters associated with the trained machine learning module 120 may refer to a training input that includes historical entity data associated with each entity, where the historical entity data may refer to a plurality of historical entities, at least one individual, a result of a client master module, a result of a profile master module, a result of an address master module, a result of constraint master module.

In some embodiments, the trained machine learning module 120 may automatically generate the internal identification token associated with each entity based on the stored information 124. The information 124 may refer a unique passcode associated with each entity, a location associated with each entity, a historical type associated with each entity, a salt value associated with a hashing algorithm of each entity, a subsequent modification to user-preferences associated with the identity of each entity; and/or a modification in authentication steps required to interact with an external computing device. In certain embodiments, the internal identification token may refer to a schema that provides additional information related to the holder of the internal identification token. In some embodiments, the trained machine learning module 120 may automatically generate the internal identification token, where the internal identification token may include a plurality of values organized in a set of features. In certain embodiments, a first set of features may refer to a unique series of digits associated with a particular constraint type; a second set of features may refer to a location associated with a particular entity; and a third set of features may refer to a historical type associated with the particular entity. In some embodiments, the plurality of features may be combined in a hashing algorithm to produce the internal identification token. In some embodiments, the trained machine learning module 120 may utilize the internal identification token to perform at least one action associated with the interaction of the plurality of entities.

In some embodiments, the trained machine learning module 120 may utilize the data workstation structure 128 to identify a plurality of login authorization and/or entitlements associated with the internal identification token to connect into an external data source to establish a session associated with at least one entity of the plurality of entities. In some embodiments, a theme management module may control styling and branding, which may be centrally managed by the data workstation framework and allows for consistent updating throughout a data ecosystem. In some embodiments, a plurality of navigations may be configurable, componentized, and entitlement based. In some embodiments, the trained machine learning module 120 may utilize the data workstation structure 128 to allow the plurality of users an ability to dynamically navigate to the platform from a menu to interact with the generated interaction session. In certain embodiments, the trained machine learning module 120 may require a digital SSO entry for each user to navigate the data workstation structure 128.

In certain embodiments, the trained machine learning module 120 may utilize the data workstation structure 128 to generate the plurality of navigations to at least one entity within the interaction session with a capability to redact at least one metadata record associated with the interaction session by adjusting a configuration associated with the generated internal identification token. For example, in the case that the constraint type is determined to be a financial transaction, a particular entity may utilize the data workstation structure 128 to remain anonymous during the interaction session if that is an acceptable parameter of the other entity within the interaction session.

In some embodiments, the trained machine learning module 120 may utilize a context passing module that includes a screen to display a plurality of transmissions between the entitles participating on the interaction session and verifies relevant context to the plurality of entities, where the relevant context is associated with the information of each entity. In some embodiments, the data workstation structure 128 may utilize the context passing module to transmit account information and client information in context for each relevant screen with the data dashboard associated with the generated interaction session. In some embodiments, the trained machine learning module 120 may utilize an entity interface layer that may be controlled by the data workstation structure 128 and may be configurable through an administration tool to allow real-time feedback from each entity participating in the generated interaction session. In some embodiments, the trained machine learning module 120 may utilize the data workstation structure 128 to render additional metadata for a plurality of applications rendered by the entity interface layer. In some embodiments, the data workstation structure 128 may provide a responsive design rendered on multiple devices, such as a screen size of 1280-1920 pixels.

In some embodiments, the data output module 122 may generate a result of an identification of the plurality of entities seeking to interact with each other. In some embodiments, the data output module 122 may generate a result of the analysis by the trained machine learning module 120 on each entity to determine the type of constraint between each entity of the plurality of entities. In some embodiments, the data output module 122 may automatically generate the internal identification token associated with each entity based on the stored information. In some embodiments, the data output module 122 may utilize the internal identification token to perform the at least one action associated with the interaction of the plurality of entities. In some embodiments, the data output module 122 may utilize the data workstation structure 128 to allow the plurality of entities an ability to dynamically navigate to the platform from a menu to interact with the generated interaction session. In certain embodiments, the data output module 122 may require a digital SSO entry for each user to navigate the data workstation structure 128.

In some embodiments, the illustrative program engine 104 may identify the plurality of entities seeking to interact with each other. In some embodiments, the illustrative program engine 104 may analyze each entity to determine the type of constraint between each entity of the plurality of entities based on a plurality of trained machine learning parameters to output the type of constraint based on an input of the entity. In some embodiments, the illustrative program engine 104 may determine the type of constraint between entity of the plurality of entities based on at least one input of each training constraint pair and at least one output of the training constraint pair. In some embodiments, the illustrative program engine 104 may automatically generate the internal identification token associated with each entity based on the stored information. In some embodiments, the illustrative program engine 104 may utilize the internal identification token to perform the at least one action associated with the interaction of the plurality of entities. In some embodiments, the illustrative program engine 104 may utilize the data workstation structure 128 to allow the plurality of entities an ability to dynamically navigate to the platform from a menu to interact with the generated interaction session. In certain embodiments, the illustrative program engine 104 may require a digital SSO entry for each user to navigate the data workstation structure 128.

In some embodiments, the non-transient memory 110 may store the identification of the plurality of entities seeking to interact with each other. In some embodiments, the non-transient memory 110 may store the analysis of each entity to determine the type of relationships between each entity of the plurality of entities. In certain embodiments, the non-transient memory 110 may store a plurality of training inputs of each training constraint pair and a plurality of training outputs of each training constraint pair. In some embodiments, the non-transient memory 110 may store the internal identification token associated with each entity based on the stored information and the schema that includes the plurality of sets of features. In some embodiments, the non-transient memory 110 may store a plurality of instructions to perform the at least one action associated with the interaction of the plurality of entities. In some embodiments, the non-transient memory 110 may store a plurality of instructions associated with the data workstation structure 128 that allow the plurality of entities an ability to dynamically navigate to the platform from a menu to interact with the generated interaction session. In certain embodiments, the non-transient memory 110 may store the digital SSO entry for each user to navigate the data workstation structure 128 for subsequent use.

Figure 2:
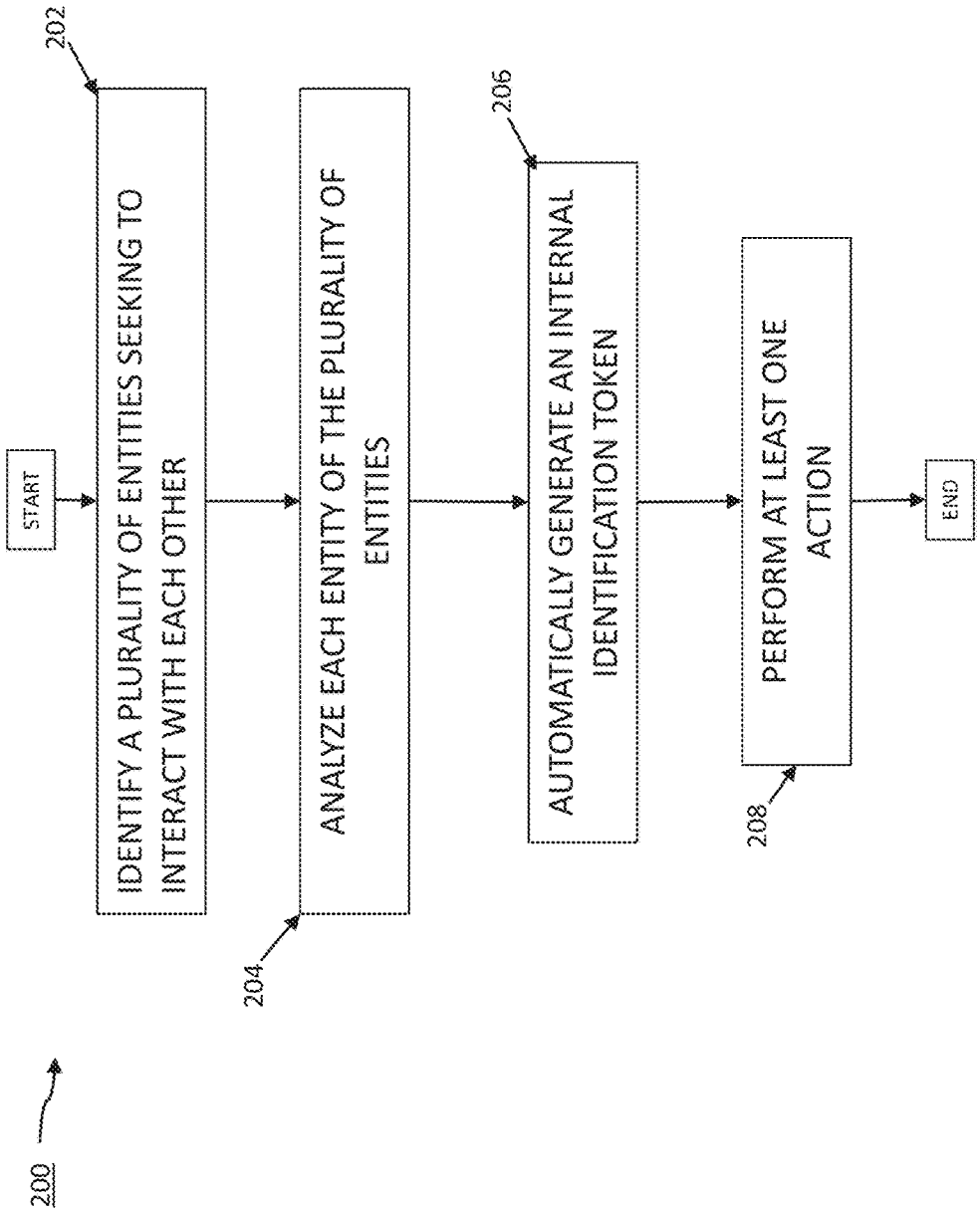
FIG. 2 is a flowchart illustrating operational steps for automatically generating an internal identification token associated with an entity, in accordance with one or more embodiments of the present disclosure.

FIG. 2 is a flowchart 200 illustrating operational steps for automatically generating an internal identification token associated with an entity, in accordance with one or more embodiments of the present disclosure.

In step 202, the illustrative program engine 104 of the computing device 102 identifies a plurality of entities seeking to interact with each other. In some embodiments, the illustrative program engine 104 may identify the plurality of entities seeking to interact with each other. In certain embodiments, each entity of the plurality of entities may refer to at least one of, but not limited to, a individual, a computing device 102 associated with the individual, a financial institution, and/or a server computing device 106 associated with a company. In some embodiments, the exemplary internal identification token generator module 118 may identify the plurality of entities seeking to interact with each other.

In step 204, the illustrative program engine 104 analyzes each entity. In some embodiments, the illustrative program engine 104 may analyze each entity to determine a type of constraint between each entity of the plurality of entities. In some embodiments, the illustrative program engine 104 may utilize the trained machine learning module 120 to analyze each entity to determine the type of constraint between each entity of the plurality of entities. In some embodiments, the analysis of each entity may refer to a performance of the trained machine learning module 120 that is trained to represent a unique structure detailing a different type of constraint based on the plurality of trained machine learning parameters. In certain embodiments, the trained machine learning module 120 may be trained to output the type of constraint type based on an input associated with each entity. In certain embodiments, the input associated with each entity may refer to at least one training input of each training constraint pair, where the at least one training input may refer to historical entity data associated with each entity. In certain embodiments, the historical entity data associated with each entity may refer to at least one of, but not limited to, a plurality of historical entities, at least one individual, a result of the client master module, a result of the profile master module, a result of the address master module, and a result of a constraint master module. In certain embodiments, the output of each training constraint pair may refer to a plurality of historical types of constraint associated with each entity. In some embodiments, the exemplary internal identification token generator module 118 may utilize the trained machine learning module 120 to analyze each entity to determine the type of constraint between each entity of the plurality of entities.

In step 206, the illustrative program engine 104 automatically generates an internal identification token. In some embodiments, the illustrative program engine 104 may automatically generate the internal identification token associated with each entity based on stored information. In certain embodiments, the internal identification token may refer to a data schema that provide information related to a holder of the internal identification token. In certain embodiments, the data schema of the internal identification token may refer to a plurality of values organized in a plurality of sets of features. In certain embodiments, the plurality of sets of features associated with the internal identification token may refer to a result of a hashing algorithm with a salting character that is unique to each holder (i.e., individual). In certain embodiments, the plurality of sets of features may include a first set of features that represent a unique series of digits associated with the particular constraint type; a second set of features that represent a location associated with the particular entity; and a third set of features that represent a historical type associated with the particular entity. In some embodiments, the exemplary internal identification token generator module 118 may automatically generate the internal identification token associated with each entity based on stored information.

In step 208, the illustrative program engine 104 performs at least one action. In some embodiments, the illustrative program engine 104 may utilize the internal identification token to perform the at least one action associated with the interaction of the plurality of entities. The program engine 104 may select, configure or otherwise determine the action based on the features encoded in the internal identification token. For example, the constraint type may be encoded as a feature in the internal identification token such that the program engine 104 may extract the feature representative of the constraint type and determine at least one action associated with the constraint type. In some embodiments, illustrative program engine 104 may exchange the internal identification token with a second token associated with another entity; verify the second token associated with the other entity; establish a connection between the two entities after verifying the authenticity of the second token, and allowing communication between the two entities after a connection is established. In certain embodiments, the at least one action may refer to a generation of an interaction session for at least two entities of the plurality of entities based on the internal identification token. In some embodiments, the exemplary internal identification token generator module 118 may utilize the internal identification token to perform the at least one action associated with the interaction of the plurality of entities. In certain embodiments, the exemplary internal identification token generator module 118 may utilize the internal identification token to establish a communication session by initiation a predetermined set of protocols or handshake procedures that depend on the type of communication being established between the at least to entities. For example, the communication session may refer to a TCP/IP socket connection, a WebSocket connection, and/or any other application-specific protocols.

In some embodiments, the exemplary internal identification token generator module 118 may utilize a data workstation structure 128, located within the computing device 102, to maintain a plurality of service layers that display the performance of the plurality of actions and subsequent actions. In certain embodiments, the plurality of service layers may refer to: an entity interface (hereinafter "UI/UX") layer, a context passing layer, a theme management layer, a masthead and/or navigation layer, and the login authorization and/or entitlements layer. In certain embodiments, the data workstation structure 128 may have a front-end framework that gives structure and control for system, pages, and components level customization.

In some embodiments, the exemplary internal identification token generator module 118 may utilize the data workstation structure 128 to allow the plurality of users an ability to dynamically navigate to the platform from a menu to interact with the generated interaction session. In certain embodiments, the exemplary internal identification token generator module 118 may require a digital SSO entry for each user to navigate the data workstation structure 128.

In some embodiments, the exemplary internal identification token generator module 118 may utilize a screen container to display a plurality of windows on a user dashboard upon launch. In some embodiments, the exemplary internal identification token generator module 118 may display a masthead menu structure based on a plurality of user entitlements within the data workstation structure 128. In some embodiments, the data workstation structure 128 may orchestrate a plurality of data windows simultaneously associated with the generated interaction session between the at least two entities of the plurality of entities. For example, the data workstation structure 128 may display internal market data in a snap quote box within at least one window of the user dashboard within the generated interaction session based on the particular constraint type. In some embodiments, the exemplary internal identification token generator module 118 may utilize data workstation structure to dynamically print via a browser print function and the plurality of individual applications may retain each applications own print functions where applicable.

Figure 3A:
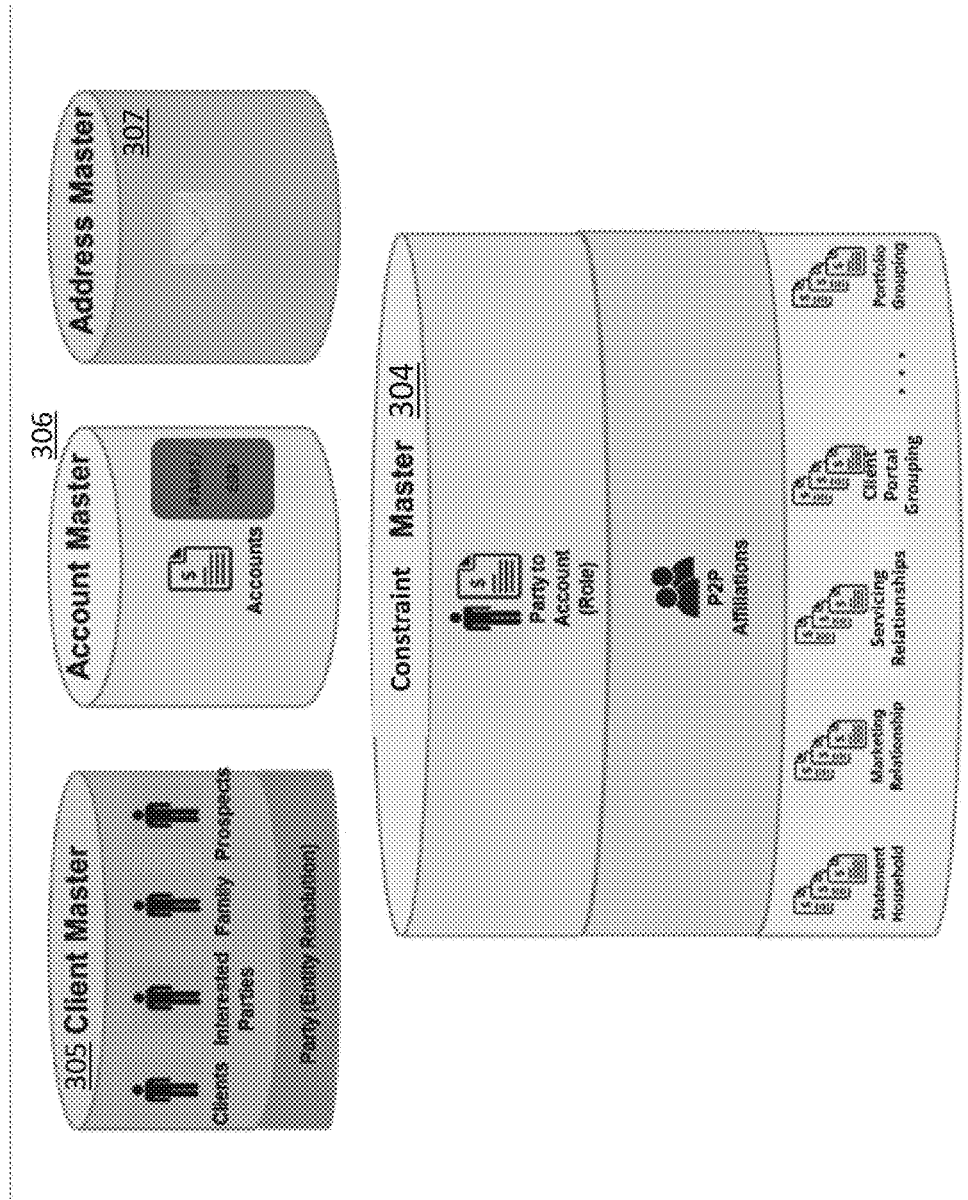
FIG. 3A and FIG. 3B are diagrams illustrating internal identification token generation module associated with the exemplary computer-based system and platform, in accordance with one or more embodiments of the present disclosure.

FIG. 3A depicts an exemplary enterprise framework 300 associated with the exemplary internal identification token generator module 118. In some embodiments, the exemplary framework 300 may refer to a constraint master framework may provide a master data structure/schema for data associated with one or more of: the client master 305, the constraint master 304, the account master 306, and the address master 307. In some embodiments, the client master 305 may store data relating to one or more of: prospects, clients, parties, spouses, children, other relatives, attorneys, accountants, interested parties, corporations, partnerships, other legal entities, partners, officers, employers, charities, entities representing sets of accounts, and any other relevant legal entity, and single entities with multiple entity records. In certain embodiments, the client master 305 may refer to the external secure data modules capable of performing the analysis to determine information associated with each entity of the plurality of entities. In certain embodiments, the exemplary internal identification token generator module 118 may utilize the client master 305 to train the machine learning module 120 and generate the internal identification token. In some embodiments, the constraint master 304 may be a single central repository of all data defining constraints associated with a plurality of relationships between at least one person and/or entities and an account; person/entities any other person/entities; addresses and accounts; accounts and other accounts; and/or groupings such as statement households and marketing households. In certain embodiments, the trained machine learning module 120 may use the data of the constraint master 304 as input for the trained constraint pairs. In some embodiments, the account master 306 may provide an internal account with a unique identification ("ID"), a related client unique ID, a related client branch encoded ID, and/or all account specific data. In some embodiments, the account master 306 may include "external" accounts that are held away, at least one mutual fund that is held away, and/or at least one qualified plan that is held away. In certain embodiments, the account master 306 may include at least one non-customer accounts, which may be associated with a firm, corporation, or treasury; and/or may be in a one-to-many account relationship. In certain embodiments, the account master 306 may refer to a profile master. In some embodiments, the address master 307 may provide centralized an address management system associated with the output of the account master 306, the constraint master 304, and the client master 305. In some embodiments, the address management system may refer to a single source for all client address "types" (e.g., residence, primary, work, summer home, etc.), which ensures data consistency across numerous address types so that any address can be used across multiple client and account contexts. In some embodiments, the address master 307 may provide linkages to results of the client master 305 and results of the account master 306, by providing address management simplified, so that one change propagates to all contexts.

Figure 3B:
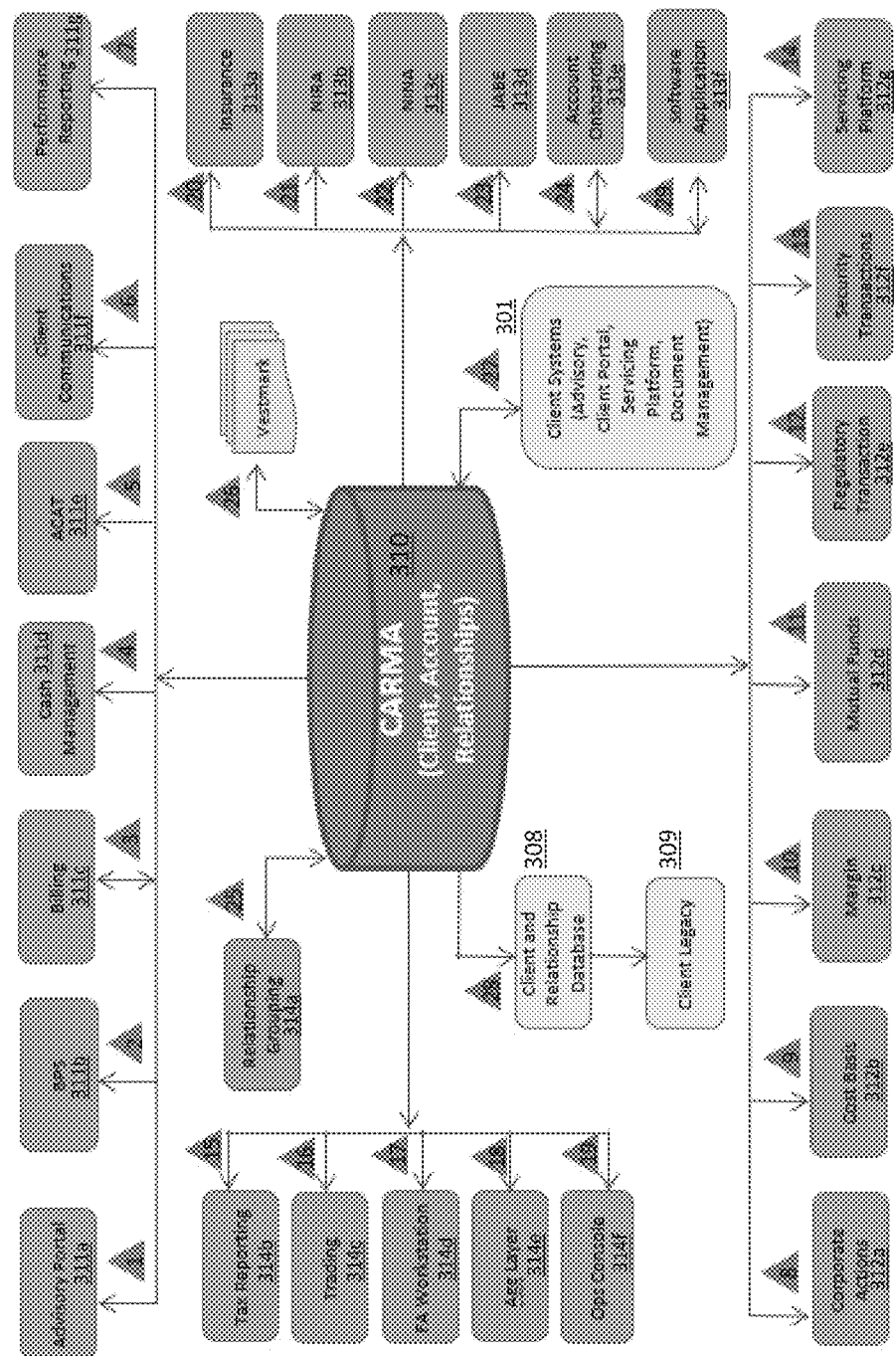

FIG. 3B depicts another schematic representation 302 of the constraint master framework 310. In some embodiments, all client system integrations may go through an enterprise integration services layer ("EISL") 301 to integrate internal and external applications while providing access to multiple data services without a need to modify formats or protocols for a plurality of different applications. In some embodiments, a client and constraint database 308 may become utilized within the constraint master framework 310 in data conversion and the exemplary internal identification token generator module 118 may back bridge data to the computing device 102 associated with the client in real-time via a client legacy database 309. In certain embodiments, the exemplary internal identification token generator module 118 may utilize the constraint master framework 310 to transmit the end of the files to the computing device 102 associated with the client in real-time. In some embodiments, the constraint master framework 310 may deliver daily feeds for display to a plurality of user interfaces 312, such as a corporate action interface 312a, a cost basis interface 312b, a margin interface 312c, a mutual fund interface 312d, a regulatory transaction interface 312e, a security transaction interface 312f, and a servicing platform interface 312g. In some embodiments, the constraint master framework 310 may stitch or break the files based on downstream needs and may deliver foundational APIs to downstream components of subsequent frameworks 313 associated with the exemplary internal identification token generator module 118. For example, the constraint master framework 310 may stitch the files based on an insurance framework 313a, a regulatory account framework 313b, a non-regulatory account framework 313c, a security module framework 313d, an account onboarding framework 313e, and a software application framework 313f. In certain embodiments, the exemplary internal identification token generator module 118 may utilize the constraint master framework 310 and/or the EISL 301 to build custom APIs 314 in response to generating the internal identification token. In certain embodiments, the custom APIs 314 may refer to particular schemas that may utilize the internal identification tokens based on the constraint pairs to verify the downstream frameworks between the plurality of entities. For example, the custom APIs 314 may include a relationship grouping layer 314a, a tax reporting layer 314b, a trading layer 314c, a workstation layer 314d, an aggregation layer 314e, and a security console layer 314f.

In another embodiment, the exemplary internal identification token generator module 118 may allow a plurality of users to navigate to any application within the data workstation structure 128 from a data dashboard, where the data dashboard provides a plurality of adjustable tab labels to reduce any confusion that may occur from generating the interaction session in a multi-window workstation. In certain embodiments, the exemplary internal identification token generator module 118 may allow each user to quickly navigate to a particular application directly from a top-level main menu associated with the generated interaction session. In certain embodiments, the exemplary internal identification token generator module 118 may allow each user to quickly navigate to a particular application directly from a top-level main menu associated with the generated interaction session. The plurality of adjustable tab labels may provide users with a plurality of navigational tools to direct to a navigation hierarchy. In some embodiments, the exemplary internal identification token generator module 118 may allow the plurality of users to quickly navigate across views using a second level navigation tool within the data workstation structure 128. In some embodiments, the data workstation structure 128 may include a database of frequently used applications associated with each user of the plurality of users. For example, the data workstation structure 128 may display the plurality of adjustable tab labels to display, at least one of, but not limited to: an advisory portal tab 311a, a back bridge data tab 311b, a billing tab 311c, a cash management tab 311d, an address management system tab 311e, a client communication tab 311f, and performance reporting tab 311g.

In some embodiments, the exemplary internal identification token generator module 118 may provide a sitemap layer to allow quick access to a plurality of recently viewed applications, a plurality of application favorites, and/or the full set of applications that are being enhanced via the data workstation structure 128. In certain embodiments, the exemplary internal identification token generator module 118 may allow each user of the plurality of users to navigate to recently viewed applications, a plurality of quick links and a plurality of user favorites based on the internal identification token.

In some embodiments, the exemplary internal identification token generator module 118 may allow the plurality of users to navigate to any main or client window within the generated interaction session. For example, the data workstation structure 128 may provide: a book query landing page window within the dashboard, where the plurality of users can launch a new application from the digital menu when that is the determined constraint type that bound the at least two entities to interact.

In certain embodiments, the exemplary internal identification token generator module 118 may allow the plurality of users to create a new query and/or navigate to a plurality of predetermined links associated with a plurality of applications. In certain embodiments, the creation of a custom query may refer to an ability to drag and drop a plurality of data attributes into the editor panel; and as the query is created, the plurality of users can preview the results in in a preview window within the data workstation structure 128.

In some embodiments, the exemplary internal identification token generator module 118 may consolidate a plurality of client and consent searches over a predetermined period of time. In some embodiments, the exemplary internal identification token generator module 118 may provide enhanced search capabilities to the plurality of users via the data workstation structure 128. In some embodiments, the exemplary internal identification token generator module 118 may expand the additional information displayed within the generated interaction session associated with the internal interaction token. In some embodiments, the exemplary internal identification token generator module 118 may modify the entity interface and/or data workstation structure 128 with a plurality of pre-generated labels and colors associated with a plurality of actions to update each window within the data workstation structure 128.

Figure 4:
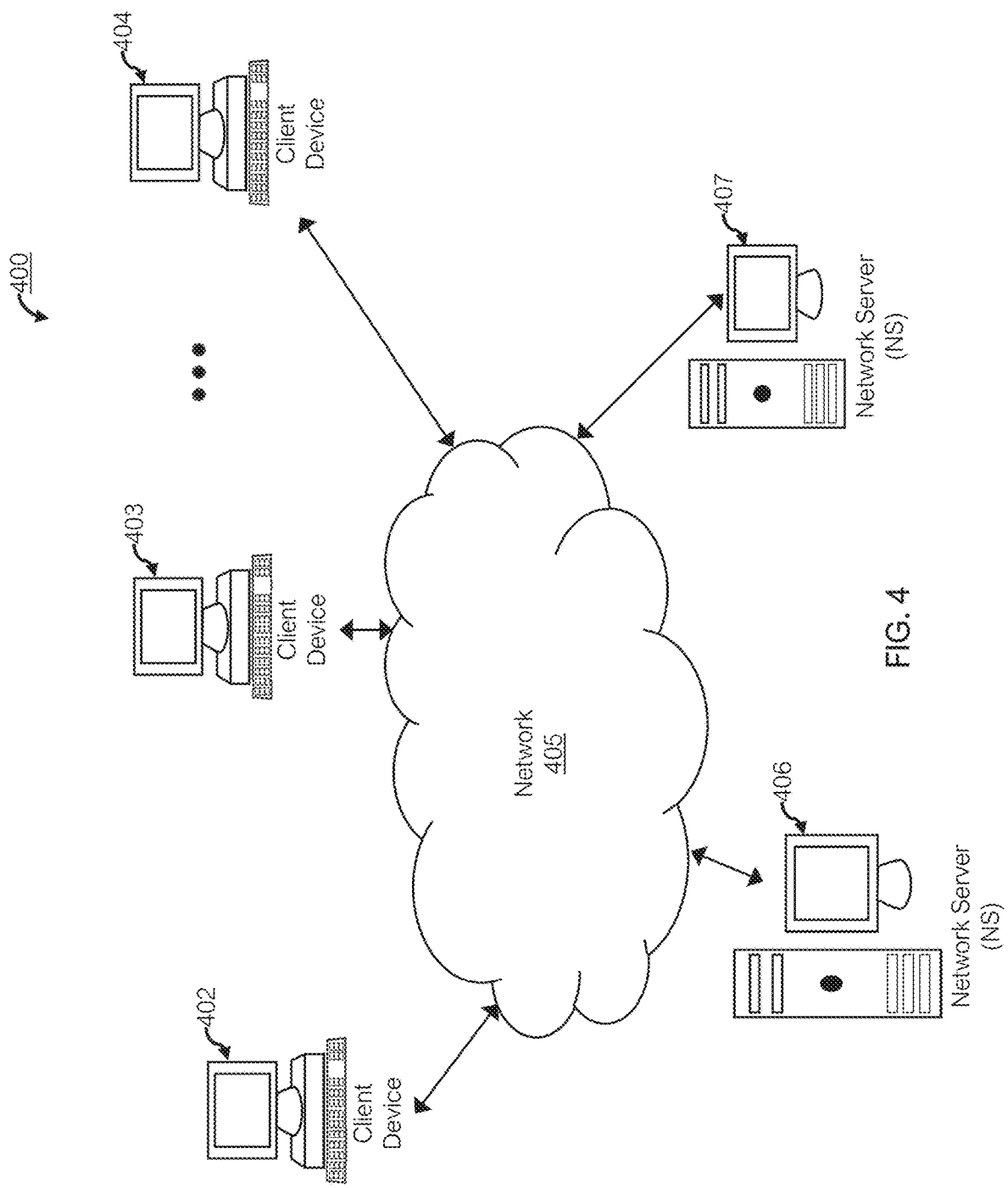
FIG. 4 depicts a block diagram of exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to automatically generate an internal identification token associated with each entity based on stored information and utilize the internal identification token to perform the at least one action associated with the interaction of the plurality of entities, as detailed herein.

In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to remotely execute the instructions associated with the exemplary processing module 118 of the present disclosure, automatically utilizing at least one machine-learning model described herein.

In some embodiments, referring to FIG. 4, members 402-404 (e.g., clients) of the exemplary computer-based system/platform 400 may include virtually any computing device capable of utilizing the exemplary internal identification token generator module 118 to automatically generate an internal identification token associated with each entity based on stored information and utilize the internal identification token to perform the at least one action associated with the interaction of the plurality of entities via a network (e.g., cloud network 109), such as network 405, to and from another computing device, such as servers 406 and 407, each other, and the like. In some embodiments, the member devices 402-404 may be smart phones, personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, the exemplary processing module 118 of the present disclosure may be configured to collect market input to modify the converted uniform data state input data to match market output data based on the established baseline and employ virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to automatically generate an internal identification token associated with each entity based on stored information and utilize the internal identification token to perform the at least one action associated with the interaction of the plurality of entities.

Figure 5:
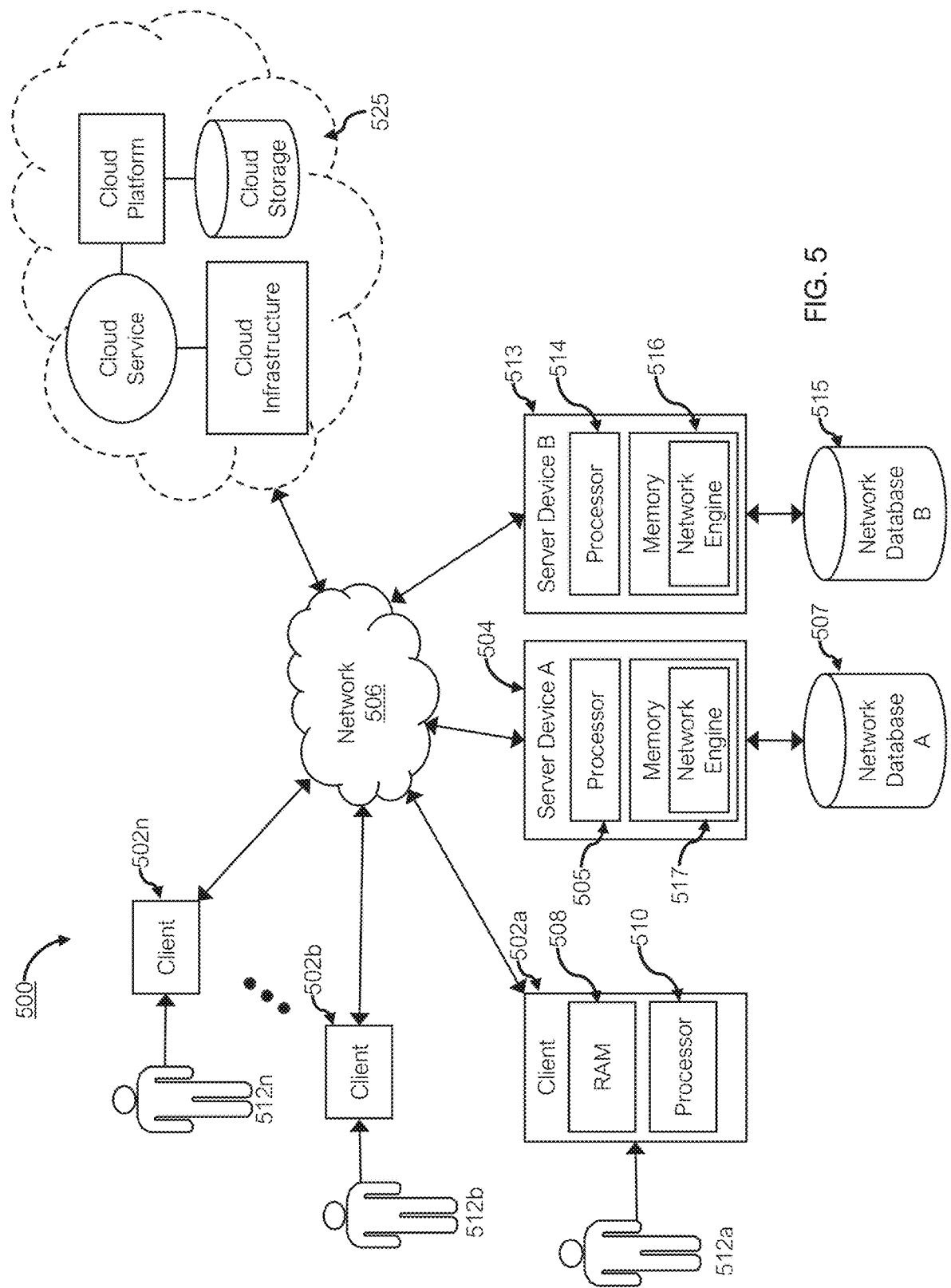
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
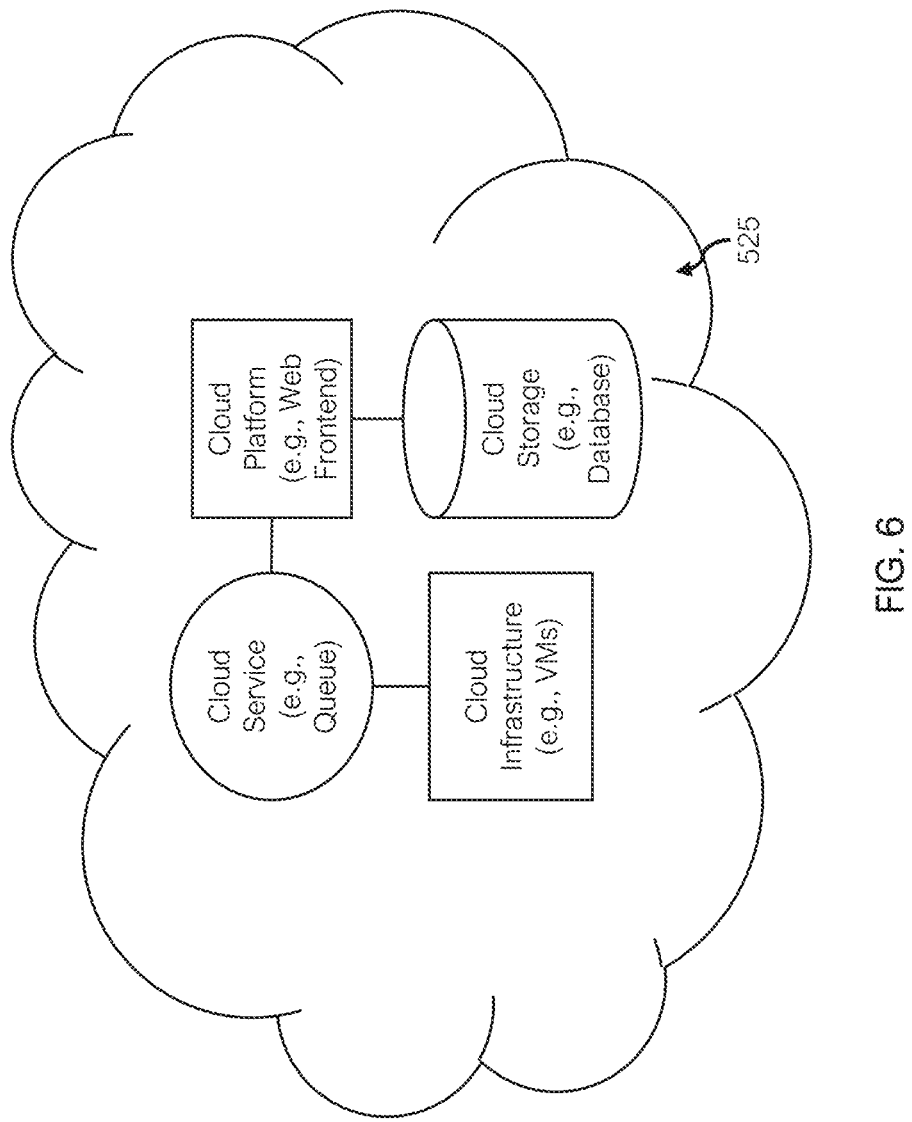
FIGS. 6 and 7 are diagrams illustrating implementations of cloud computing architecture/aspects with respect to which the disclosed technology may be specifically configured to operate, in accordance with one or more embodiments of the present disclosure.
Figure 7:
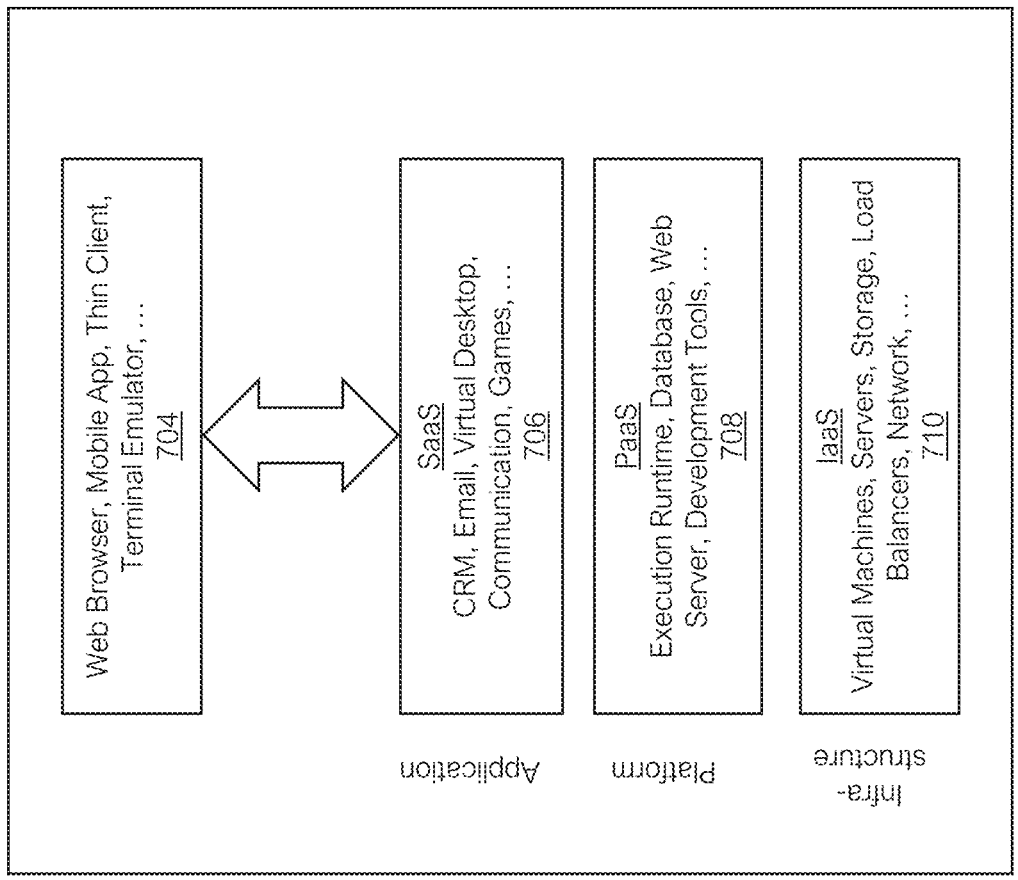

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary spam prevention module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary spam prevention module 118 of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: identifying, by at least one processor, a plurality of entities seeking to interact with each other; analyzing, by the at least one processor, each entity to determine a type of constraint between each entity of the plurality of entities, where an analysis is performed using a trained machine learning module, where the trained machine learning module includes a plurality of trained machine learning parameters, where the plurality of trained machine learning parameters are trained on training constraint pairs, each training constraint pair including: at least one training input of each training constraint pair, the at least one training input including historical entity data associated with each entity, the historical entity data being associated with at least one of: a plurality of historical entities, at least one individual, a result of a client master module, a result of a profile master module, a result of an address master module, and a result of a constraint master module; and at least one training output of each training constraint pair, the at least one training output including a plurality of historical types of constraint associated with each entity; automatically generating, by the at least one processor, an internal identification token associated with each entity based on stored information, where the internal identification token includes a schema that provides information related to a holder of the internal identification token; and utilizing, by the at least one processor, the internal identification token to perform at least one action associated with the interaction of the plurality of entities.

Clause 2. The method according to clause 1, where the trained machine learning module is trained to represent a unique structure detailing a different type of relationship.

Clause 3. The method according to clause 1 or 2, where the trained machine learning module includes a trained machine learning model including a plurality of trained machine learning parameters.

Clause 4. The method according to clause 1, 2 or 3, where the plurality of trained machine learning parameters are trained to output the type of constraint based on an input of an entity.

Clause 5. The method according to clause 1, 2, 3 or 4, where the information includes a unique passcode associated with each entity, a location associated with each entity, a historical type associated with each entity, and a salt value associated with a hashing algorithm of each entity.

Clause 6. The method according to clause 1, 2, 3, 4 or 5, where the profile master module includes an account master module.

Clause 7. The method according to clause 1, 2, 3, 4, 5 or 6, where the schema includes a plurality of values organized in a plurality of sets of features.

Clause 8. The method according to clause 1, 2, 3, 4, 5, 6 or 7, where a first set of features of the plurality of sets of features represents a unique series of digits associated with a particular constraint type, a second set of features of the plurality of sets of features represents a location associated with a particular entity, and a third set of features of the plurality of sets of features represents a historical type associated with the particular entity.

Clause 9. The method according to clause 1, 2, 3, 4, 5, 6, 7 or 8, where the plurality of sets of features are combined in a hashing algorithm to produce the internal identification token.

Clause 10. The method according to clause 1, 2, 3, 4, 5, 6, 7, 8 or 9, where the at least one action includes generating an interaction session for the at least two entities to interact based on the internal identification token.

Clause 11. The method according to clause 1, 2, 3, 4, 5, 6, 7, 8, 9 or 10, further including utilizing a data workstation structure to display a plurality of data layers for use during the generated interaction session.

Clause 12. The method according to clause 1, 2, 3, 4, 5, 6, 7, 8, 9, 10 or 11, where the data workstation structure includes: an entity interface layer, a context passing layer, a theme management layer, a navigation layer, and a login authorization layer.

Clause 13. The method according to clause 1, 2, 3, 4, 5, 6, 7, 8, 9, 10, 11 or 12, further including utilizing a data workstation structure to: providing a sitemap layer with a plurality of recently viewed applications in response to the entity entering the generated interaction session; optimizing navigational capabilities associated with the generated interaction session; generating at least one query of information within the generated interaction session; and automatically displaying at least one result of the at least one query on at least one window of the data workstation structure based on the sitemap layer and the navigational capabilities.

Clause 14. A non-transitory computer-readable storage medium tangibly encoded with computer-executable instructions, that when executed by a device, perform a method including: identifying, by at least one processor, a plurality of entities seeking to interact with each other; analyzing, by the at least one processor, each entity to determine a type of constraint between each entity of the plurality of entities, where an analysis is performed using a trained machine learning module, where the trained machine learning module includes a plurality of trained machine learning parameters, where the plurality of trained machine learning parameters are trained on training constraint pairs, each training constraint pair including: at least one training input of each training constraint pair, the at least one training input including historical entity data associated with each entity, the historical entity data being associated with at least one of: a plurality of historical entities, at least one individual, a result of a client master module, a result of a profile master module, a result of an address master module, and a result of a constraint master module; and at least one training output of each training constraint pair, the at least one training output including a plurality of historical types of constraint associated with each entity; automatically generating, by the at least one processor, an internal identification token associated with each entity based on stored information, where the internal identification token includes a schema that provides information related to a holder of the internal identification token; and utilizing, by the at least one processor, the internal identification token to perform at least one action associated with the interaction of the plurality of entities.

Clause 15. The non-transitory computer-readable storage medium according to clause 14, where the trained machine learning module is trained to represent a unique structure detailing a different type of relationship.

Clause 16. The non-transitory computer-readable storage medium according to clause 14 or 15, where the trained machine learning module includes a trained machine learning model including a plurality of trained machine learning parameters.

Clause 17. The non-transitory computer-readable storage medium according to clause 14, 15 or 16, where the plurality of trained machine learning parameters are trained to output the type of constraint based on an input of an entity.

Clause 18. The non-transitory computer-readable storage medium according to clause 14, 15, 16 or 17, where the information includes a unique passcode associated with each entity, a location associated with each entity, a historical type associated with each entity, and a salt value associated with a hashing algorithm of each entity.

Clause 19. The non-transitory computer-readable storage medium according to clause 14, 15, 16, 17 or 18, where the schema includes a plurality of values organized in a plurality of sets of features.

Clause 20. A system including: a non-transient computer memory, storing software instructions; at least one processor of a computing device associated with a user; where, when the at least one processor executes the software instructions, the computing device is programmed to: identify a plurality of entities seeking to interact with each other; analyze each entity to determine a type of constraint between each entity of the plurality of entities, where an analysis is performed using a trained machine learning module, where the trained machine learning module includes a plurality of trained machine learning parameters, where the plurality of trained machine learning parameters are trained on training constraint pairs, each training constraint pair including: at least one training input of each training constraint pair, the at least one training input including historical entity data associated with each entity, the historical entity data being associated with at least one of: a plurality of historical entities, at least one individual, a result of a client master module, a result of a profile master module, a result of an address master module, and a result of a constraint master module; and at least one training output of each training constraint pair, the at least one training output including a plurality of historical types of constraint associated with each entity; automatically generate an internal identification token associated with each entity based on stored information, where the internal identification token comprises a schema that provides information related to a holder of the internal identification token; and utilize the internal identification token to perform at least one action associated with the interaction of the plurality of entities.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
identifying, by at least one processor, a plurality of entities seeking to interact with each other;
analyzing, by the at least one processor, each entity to determine a type of constraint between each entity of the plurality of entities,
wherein an analysis is performed using a trained machine learning module,
wherein the trained machine learning module comprises a plurality of trained machine learning parameters,
wherein the plurality of trained machine learning parameters are trained on training constraint pairs, each training constraint pair comprising:
at least one training input of each training constraint pair, the at least one training input comprising historical entity data associated with each entity, the historical entity data being associated with at least one of:
a plurality of historical entities,
at least one individual, a result of a client master module,
a result of a profile master module,
a result of an address master module, and
a result of a constraint master module; and
at least one training output of each training constraint pair, the at least one training output comprising a plurality of historical types of constraint associated with each entity;
automatically generating, by the at least one processor, an internal identification token associated with each entity based on stored information and the type of constraint between each entity of the plurality of entities,
wherein the internal identification token comprises a schema that provides information related to a holder of the internal identification token;
wherein the schema comprises a plurality of values organized in a plurality of sets of features;
wherein a first set of features of the plurality of sets of features represents a unique series of digits associated with a particular constraint type, a second set of features of the plurality of sets of features represents a location associated with a particular entity, and a third set of features of the plurality of sets of features represents a historical type associated with the particular entity;
wherein the plurality of sets of features are combined in a hashing algorithm with a salting character to produce the internal identification token that is unique to the holder;
utilizing, by the at least one processor, the internal identification token to perform at least one action associated with the interaction of the plurality of entities; and
wherein the at least one action comprises generating an interaction session for at least two entities to interact based on the internal identification token.

2. The computer-implemented method of claim 1, wherein the trained machine learning module is trained to represent a unique structure detailing a different type of relationship.

3. The computer-implemented method of claim 1, wherein the trained machine learning module comprises a trained machine learning model comprising a plurality of trained machine learning parameters.

4. The computer-implemented method of claim 3, wherein the plurality of trained machine learning parameters are trained to output the type of constraint based on an input of an entity.

5. The computer-implemented method of claim 1, wherein the information comprises a unique passcode associated with each entity, a location associated with each entity, a historical type associated with each entity, and a salt value associated with a hashing algorithm of each entity.

6. The computer-implemented method of claim 5, wherein the profile master module comprises an account master module.

7. The computer-implemented method of claim 1, further comprising utilizing a data workstation structure to display a plurality of data layers for use during the generated interaction session.

8. The computer-implemented method of claim 7, wherein the data workstation structure comprises:
an entity interface layer,
a context passing layer,
a theme management layer,
a navigation layer, and
a login authorization layer.

9. The computer-implemented method of claim 1, further comprising utilizing a data workstation structure to:
providing a sitemap layer with a plurality of recently viewed applications in response to an entity entering the generated interaction session;
optimizing navigational capabilities associated with the generated interaction session;
generating at least one query of information within the generated interaction session; and
automatically displaying at least one result of the at least one query on at least one window of the data workstation structure based on the sitemap layer and the navigational capabilities.

10. A non-transitory computer-readable storage medium tangibly encoded with computer-executable instructions, that when executed by a device, perform a method comprising:
identifying, by at least one processor, a plurality of entities seeking to interact with each other;
analyzing, by the at least one processor, each entity to determine a type of constraint between each entity of the plurality of entities,
wherein an analysis is performed using a trained machine learning module,
wherein the trained machine learning module comprises a plurality of trained machine learning parameters,
wherein the plurality of trained machine learning parameters are trained on training constraint pairs, each training constraint pair comprising:
at least one training input of each training constraint pair, the at least one training input comprising historical entity data associated with each entity, the historical entity data being associated with at least one of:
a plurality of historical entities,
at least one individual,
a result of a client master module,
a result of a profile master module,
a result of an address master module, and
a result of a constraint master module; and
at least one training output of each training constraint pair, the at least one training output comprising a plurality of historical types of constraint associated with each entity;
automatically generating, by the at least one processor, an internal identification token associated with each entity based on stored information,
wherein the internal identification token comprises a schema that provides information related to a holder of the internal identification token;
wherein the schema comprises a plurality of values organized in a plurality of sets of features;
wherein a first set of features of the plurality of sets of features represents a unique series of digits associated with a particular constraint type, a second set of features of the plurality of sets of features represents a location associated with a particular entity, and a third set of features of the plurality of sets of features represents a historical type associated with the particular entity;
wherein the plurality of sets of features are combined in a hashing algorithm with a salting character to produce the internal identification token that is unique to the holder;

utilizing, by the at least one processor, the internal identification token to perform at least one action associated with the interaction of the plurality of entities; and wherein the at least one action comprises generating an interaction session for at least two entities to interact based on the internal identification token.

11. The non-transitory computer-readable storage medium of claim 10, wherein the trained machine learning module is trained to represent a unique structure detailing a different type of relationship.

12. The non-transitory computer-readable storage medium of claim 10, wherein the trained machine learning module comprises a trained machine learning model comprising a plurality of trained machine learning parameters.

13. The non-transitory computer-readable storage medium of claim 12, wherein the plurality of trained machine learning parameters are trained to output the type of constraint based on an input of an entity.

14. The non-transitory computer-readable storage medium of claim 10, wherein the information comprises a unique passcode associated with each entity, a location associated with each entity, a historical type associated with each entity, and a salt value associated with a hashing algorithm of each entity.

15. A system comprising:
a non-transitory computer memory, storing software instructions;
at least one processor of a computing device associated with a user;
wherein, when the at least one processor executes the software instructions, the computing device is programmed to:
identify a plurality of entities seeking to interact with each other;
analyze each entity to determine a type of constraint between each entity of the plurality of entities,
wherein an analysis is performed using a trained machine learning module,
wherein the trained machine learning module comprises a plurality of trained machine learning parameters,
wherein the plurality of trained machine learning parameters are trained on training constraint pairs, each training constraint pair comprising:
at least one training input of each training constraint pair, the at least one training input comprising historical entity data associated with each entity, the historical entity data being associated with at least one of:
a plurality of historical entities,
at least one individual,
a result of a client master module,
a result of a profile master module,
a result of an address master module, and
a result of a constraint master module; and
at least one training output of each training constraint pair, the at least one training output comprising a plurality of historical types of constraint associated with each entity;
automatically generate an internal identification token associated with each entity based on stored information,
wherein the internal identification token comprises a schema that provides information related to a holder of the internal identification token;
wherein the schema comprises a plurality of values organized in a plurality of sets of features;
wherein a first set of features of the plurality of sets of features represents a unique series of digits associated with a particular constraint type, a second set of features of the plurality of sets of features represents a location associated with a particular entity, and a third set of features of the plurality of sets of features represents a historical type associated with the particular entity;
wherein the plurality of sets of features are combined in a hashing algorithm with a salting character to produce the internal identification token that is unique to the holder;
utilize the internal identification token to perform at least one action associated with the interaction of the plurality of entities; and
wherein the at least one action comprises generating an interaction session for at least two entities to interact based on the internal identification token.

* * * * *